(12) United States Patent
Fini

(10) Patent No.: US 7,628,892 B2
(45) Date of Patent: Dec. 8, 2009

(54) SYSTEM AND PROCESS FOR THE PRODUCTION OF COMBUSTIBLE SUBSTANCES BY DEPOLYMERISATION OF RUBBER PRODUCTS

(75) Inventor: Franco Fini, Via Monte Grappa 40, I-58022 Follonica (GR) (IT)

(73) Assignees: Pernilla Finanziaria S.A., Lugano (CH), part interest; Romana Maceri Centro Italia S.r.l., Civitella in Val di Chiana Loc. Tuori, AR (IT), part interest; Franco Fini, Follonica, GR (IT), part interest; Renato Mencarelli, Asciano, SI (IT), part interest ( * ) Notice: Subject to any disclaimer, the term of this patent is extended or adjusted under 35 U.S.C. 154(b) by 382 days.

(21) Appl. No.: 11/569,516

(22) PCT Filed: May 31, 2005

(86) PCT No.: PCT/IT2005/000309

§ 371 (c)(1), (2), (4) Date: Nov. 22, 2006

(87) PCT Pub. No.: WO2005/121278

PCT Pub. Date: Dec. 22, 2005

(65) Prior Publication Data
US 2008/0035079 A1 Feb. 14, 2008

(30) Foreign Application Priority Data
Jun. 9, 2004 (IT) .......................... FI2004A0127

(51) Int. Cl.
*C10B 53/08* (2006.01)

(52) U.S. Cl. .................. 201/7; 201/8; 201/25; 201/27; 201/30; 202/117; 422/209; 422/233

(58) Field of Classification Search ..................... 201/7, 201/8, 25, 27, 30; 202/117; 110/210, 234; 48/122; 422/209, 233
See application file for complete search history.

(56) References Cited

U.S. PATENT DOCUMENTS 4,740,270 A * 4/1988 Roy ............................. 201/35
4,846,082 A * 7/1989 Marangoni ................... 110/234

(Continued)

FOREIGN PATENT DOCUMENTS

EP 0 694 600 A1 1/1996

*Primary Examiner*—N. Bhat
(74) *Attorney, Agent, or Firm*—McGlew and Tuttle, P.C.

(57) ABSTRACT

A system and process for the production of combustible substances by means of depolymerisation of rubber products, comprising a depressurized depolymerising device (1), inside which it takes place the depolymerisation of a predetermined quantity of products introduced at its inner, characterized in that it comprises a divider or phases separator (2) disposed downstream said depolymerising device (1), which consists of a substantially cylindrical body, with an upper base (20) and a lower base (21), and is connected with the depolymerising device (1) by means of a pipe (3): said phases separator (2) being apt to carry out the separation of at least a part of the liquid phase of the products exiting the depolymerising device (1), and having an outlet (23) for the thus separated liquid phase and an outlet (24) for the remaining part of the products in mostly gaseous phase.

10 Claims, 4 Drawing Sheets

U.S. PATENT DOCUMENTS

| | | | |
|---|---|---|---|
| 5,095,040 A | 3/1992 | Ledford | |
| 5,224,431 A * | 7/1993 | Lee et al. | 110/210 |
| 5,369,215 A * | 11/1994 | Platz | 585/241 |
| 5,435,890 A | 7/1995 | Munger | |
| 5,851,246 A * | 12/1998 | Bishop et al. | 48/122 |
| 6,005,149 A * | 12/1999 | Bishop | 585/241 |
| 6,249,135 B1 * | 6/2001 | Maruyama et al. | 324/765 |
| 6,589,417 B2 * | 7/2003 | Taciuk et al. | 208/179 |
| 6,790,383 B2 * | 9/2004 | Kim | 252/373 |

* cited by examiner

SYSTEM AND PROCESS FOR THE PRODUCTION OF COMBUSTIBLE SUBSTANCES BY DEPOLYMERISATION OF RUBBER PRODUCTS

CROSS REFERENCE TO RELATED APPLICATIONS

This application is a United States National Phase application of International Application PCT/IT2005/000309 and claims the benefit of priority under 35 U.S.C. § 119 of Italian patent application FI2004A000127 filed Jun. 9, 2004, the entire contents of which are incorporated herein by reference.

The present invention relates to a plant and a process for the production of combustible substances by depolymerisation of rubber products.

EP-0694600 discloses a process and a plant for producing combustible substances by depolymerisation of worn tires: a predetermined amount of worn tires is disposed in a depressurized depolymerising device, the depolymerisation temperature is kept between 100° C. and 135° C., said temperature is controlled by introducing water and air in the depolymerisation device, and a predetermined quantity of calcium oxide is added to the tires before starting the process. According to the above-mentioned patent, it is obtained a substance constituted by liquid state hydrocarbon micro-particles suspended in a gaseous fluid. Such substance is conveyed to a burner where it is immediately used. But this known process imposes, as said above, to use immediately the combustible substance thus produced, by transforming it entirely into thermal energy, not being possible to store even a part of it. Moreover, the combustible substance thus obtained isn't advantageously usable for producing electric power.

An aim of the present invention is to eliminate said drawback, making the elimination of the worn tires and, more in general, of other rubber materials, particularly advantageous from the economic point of view.

Another aim of the invention is to contribute to a more effective and rational elimination of cumbersome and environmentally damaging waste like the worn tires.

These results have been achieved according to the invention thanks to the idea of actuating a plant and an operative process having the features described in independent claims. Other features relate to the dependant claims.

Thanks to the present invention, it is possible to obtain a production of liquid and storable combustible substances, with a high output. It is also possible to immediately use the gaseous substances, suitably filtered and aspired with the air in a diesel engine which is supplied with the decanted liquid produced by the present plant or supplied with diesel oil mixed with said liquid. Moreover, the physicochemical features of the combustible substances thus obtained are fully compatible with a pluralities of uses without any other treatment and in the full respect of the environmental standards, not being produced polluting substances in harmful concentration or quantities. It is also possible to obtain other economic advantages through the recovery and the re-use of metallic materials contained in the tires and similar, thus treated, which constitute the largest part of the treatment residues. It is also possible to obtain economic advantages, in addition to the environmental advantages, from the treatment of rubber waste materials different from the tires.

These and other advantages and characteristics of the invention will be best understood by anyone skilled in the art from a reading of the following description in conjunction with the attached drawings given as a practical exemplification of the invention, but not to be considered in a limitative sense.

Figure 1:
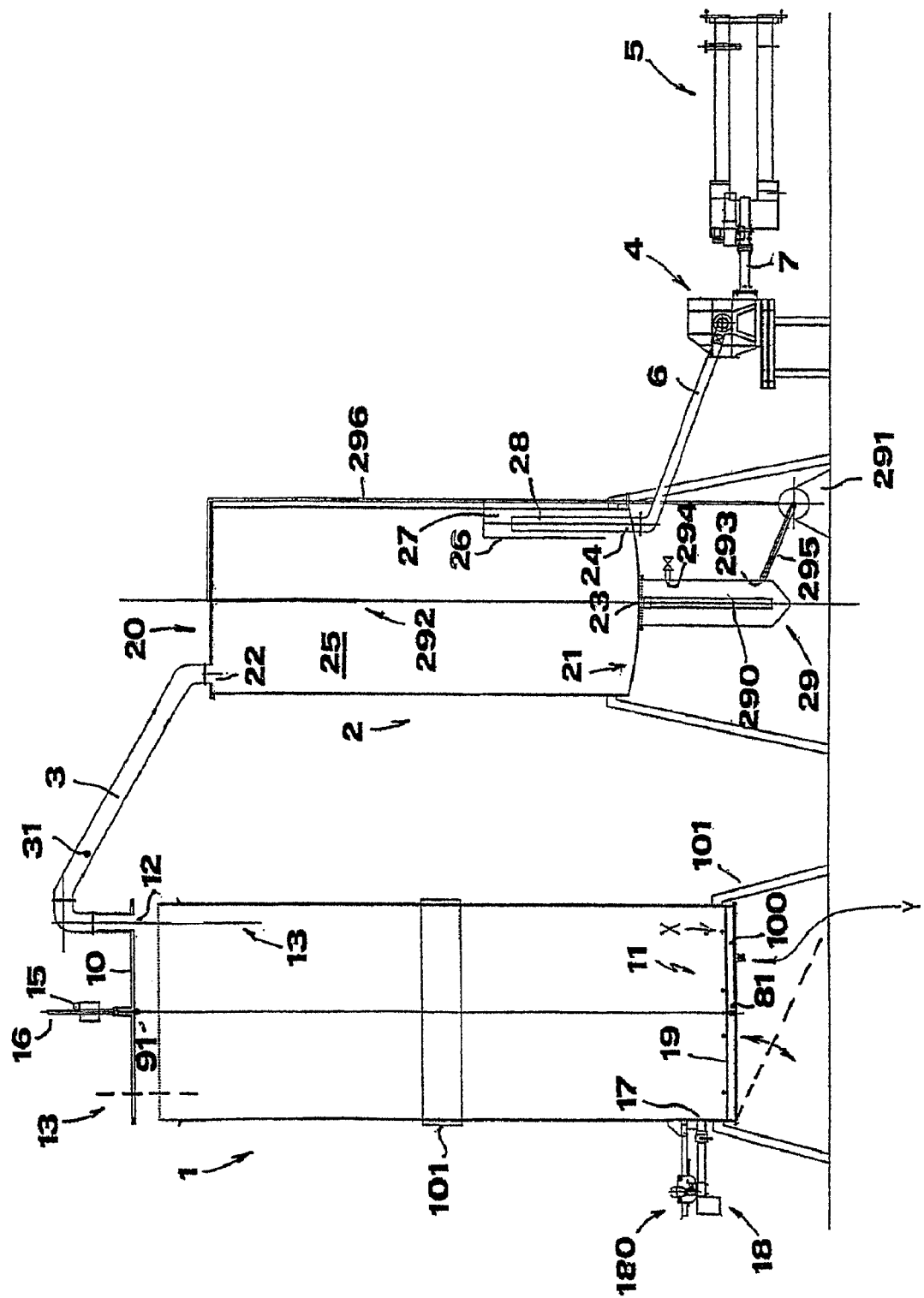
FIG. 1 schematically represents a plant according to the invention, in which it is used a divider of phase and a burner.
Figure 2:
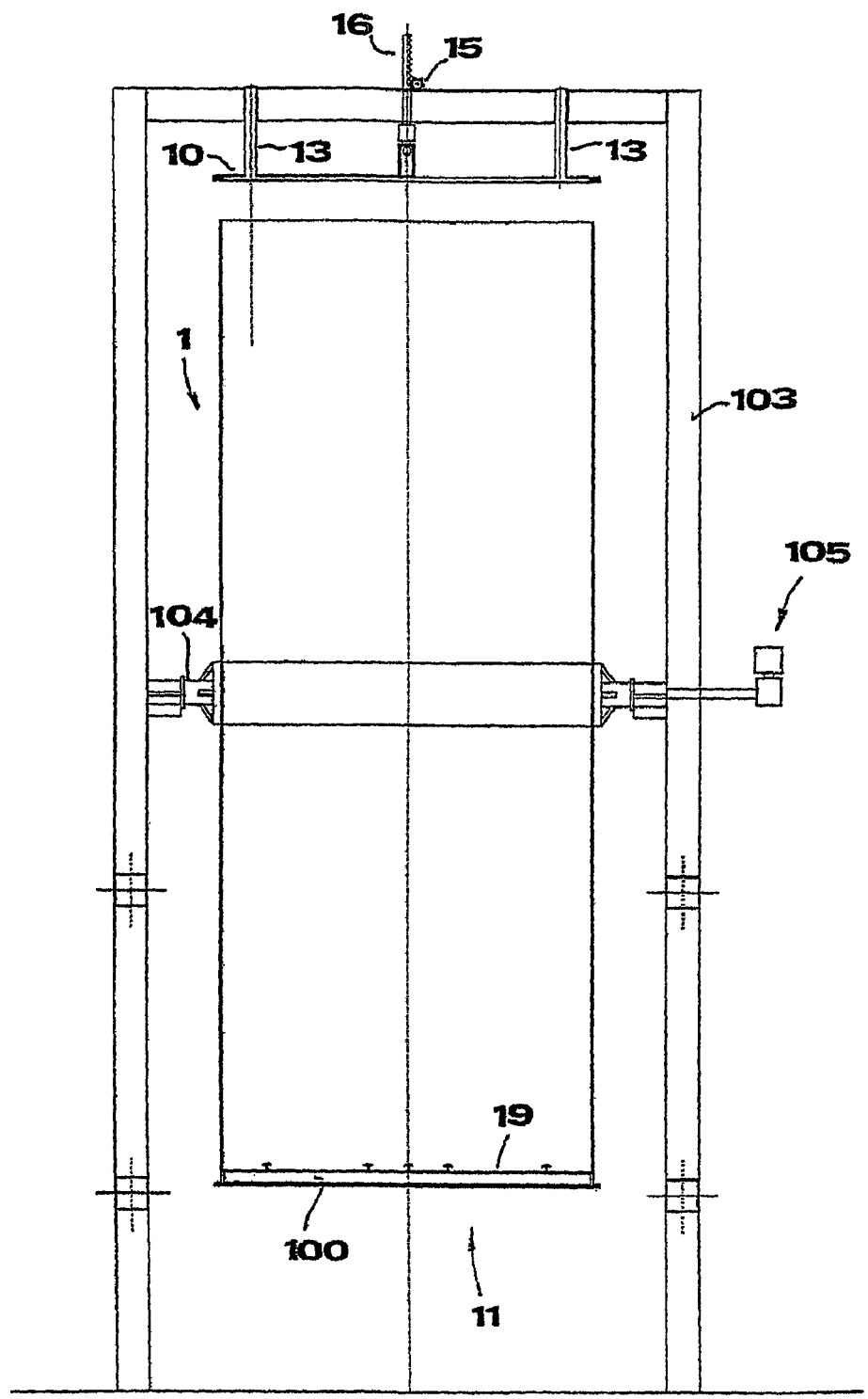
FIG. 2 represents another embodiment of the depolymerising device.
Figure 3:
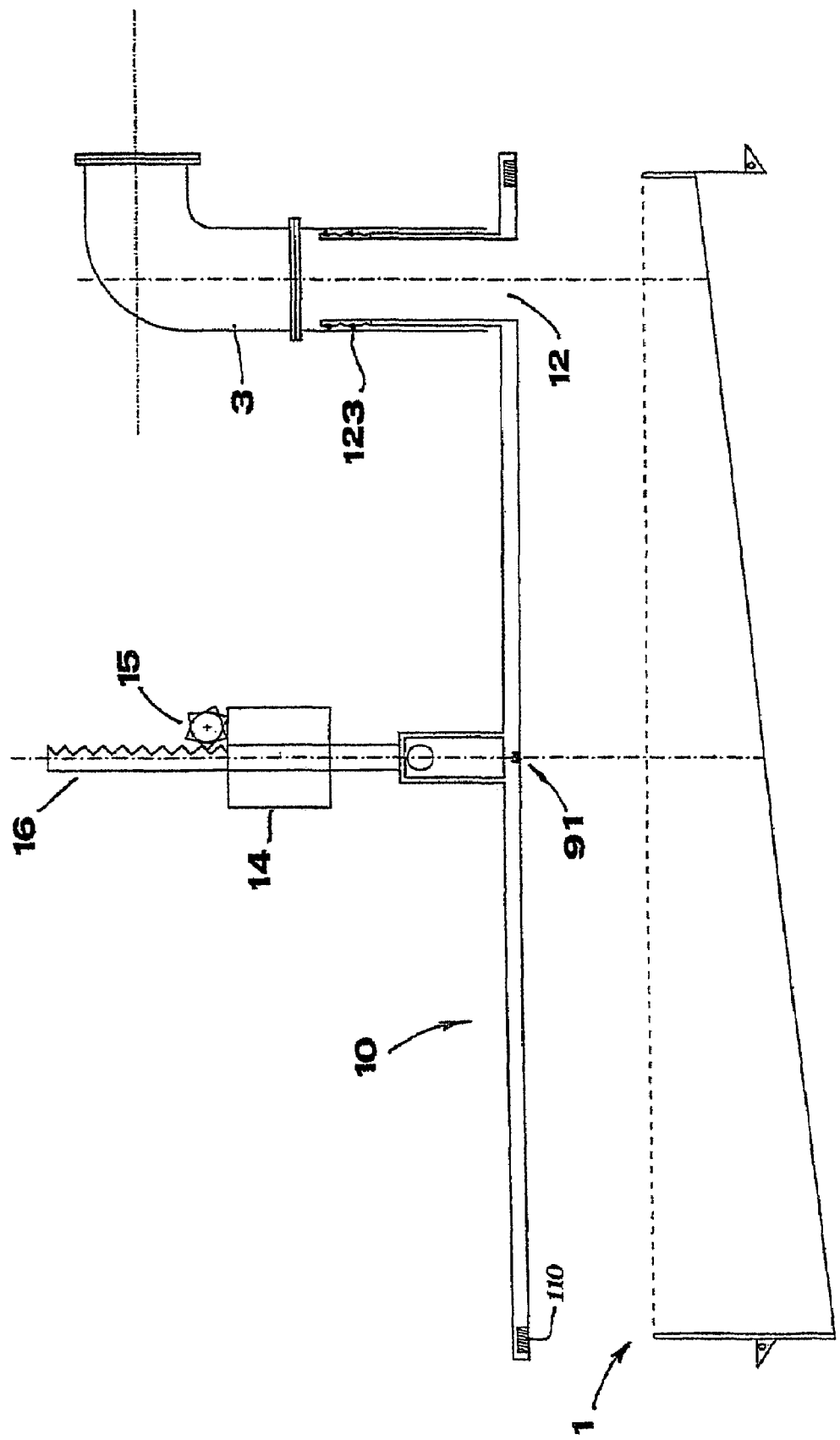
FIG. 3 represents an enlarged detail of the upper part of depolymerising device of FIGS. 1 and 2.

Reduced to its essential structure and with reference to FIGS. 1-3 of the annexed drawings, a plant for the production of combustible substances in accordance with the invention comprises:

a depolymerising device (1), which consists of a substantially cylindrical body with circular section, with an upper base (10), and a lower base (11); Inside said device it takes place, as described thereafter, the depolymerisation of a predetermined quantity of tires or other rubber products, introduced into the same device through the upper base (10), which can be opened, and forming a heap on a horizontal grid (19) which is placed at a predetermined distance from the lower base (11) forming a correspondent interstice (100) through which, as described later on, the combustive air passes;

a divider or phases separator (2) disposed downstream from said depolymerising device (1), which is constituted of a substantially cylindrical body with circular section, with an upper base (20) and a lower base (21), and is connected with the depolymerising device (1) by means of a pipe (3) provided between an opening (12) of the upper base (10) of the depolymerising device (1) and a corresponding opening (22) of the upper base (20) of the divider (2): said divider (2) being apt to carry out the separation of at least a part of the liquid phase of the products exiting the depolymerising device (1) from the gaseous phase, and being provided with an outlet (23) for the thus separated liquid phase, and an outlet (24) for the remaining part of the products which are in mostly gaseous phase;

an aspiration unit (4), apt to maintain in depression, i.e. apt to depressurize, the depolymerising device (1) and the phases separator (2), unit (4) which is connected, upstream, with the outlet (24) for the gaseous phase provided by the separator (2) and, downstream, with a burner (5) by means of two correspondents pipes (6, 7), so that the mostly gaseous phase of the products exiting the depolymerising device (1) supplies the burner (5).

Advantageously, the upper base (10) of the depolymerising device (1) is mounted on vertical guides (13) and is connected to an electric motor (14) by means of a pinion and toothed rack (15, 16), to allow the rising and the lowering of the same base, i.e. to allow the introduction of the materials to be treated in the depolymerising device (1) and, successively, the tight closing of the base, which is ensured by a circular seal placed under the aforesaid base (10) and coincides with the upper circular edge of the depolymerising device (1).

In proximity of its lower base (11), the depolymerising device (1) has an opening provided with a valve (17) which constitutes a passage for a burner (18) disposed on a carriage whose function, as best described thereafter, is to start the combustion of the rubber products introduced into depolymerising device.

In said interstice (100) it is also conveyed water, when necessary.

Advantageously, there are three thermal control sensors (81, 91, 31). The first of them (81) is placed in the interstice (100) of the depolymerising device (1) for sensing the air temperature in a lower position in respect to the aforementioned grid (19). The second sensor (91) is placed on the lower or inner surface of the upper base (10) of the depolymerising device (1) and it senses the temperature of the products heap during the depolymerisation. The third sensor (31) is placed in the pipe (3) which connects the depolymerising device (1) to the phases separator (2) to sense the temperature of the fluid which transits in the latter.

The phases separator (2) is made, as previously described, by a substantially cylindrical body with an upper base (20) and a lower base (21), delimiting, in such a way, a corresponding chamber (25). On a side of the chamber (25) a septum or wall (26) is placed, so as to delimit a second chamber (27) which is closed on the upper side and open in the lower side. Said second chamber (27) houses a vertical pipe (28) having an end in correspondence of the aforesaid opening (24) of the lower base (21) of the body (2): the other end of the pipe (28) being at a predetermined distance from the lower opening of the wall (26). In such a way, the pipe (28) is connected with the unit (4) by the pipe (6). Under said opening (23) provided by the separator (2), a container (29) is placed, in which the liquid exiting from the separator is conveyed by a correspondent pipe (290). Said container (29) has a lower opening (293) connected with a pump (291) which reintroduces in the chamber (25) the liquid which is discharged from the same, by means of one or more injectors or atomizers (292) disposed at a predetermined distance from the upper base (20) of the body (2). The connection between said opening (293) of the container (29) and said pump (291) is made by means of a pipe (295) and the connection between the pump (291) and the injectors (292) is made by means of a further pipe (296) whose final portion is inside the chamber (25) and passes through the upper base (20) of the body (2). Moreover, said container (29) exhibits an upper opening (294) for draining the liquid which is not re-circulated by the pump (291) and which, in practice, constitutes the liquid phase hydrocarbons production of the moment. The length of said pipe (290) is related to the prevalence of the unit (4) and is determined in such a manner that the latter does not allow aspiration of air through the upper opening (294) of the container (29). For example, if the prevalence of the unit (4) is 150 mm water column, the distance between the lower end of the pipe (290) and the opening for draining (294) of the container (29) must be higher than 150 mm.

Said unit (4) provides either for the aspiration of the products in the mostly gaseous phase from the pipe (28) inside the body (2) and for their compression before the introduction into the burner (5). Both the unit (4) and the burner (5) are of the known type and, consequently, they are not further described.

The operation of the plant described above is as follows.

Once introduced the tires and other rubber products to be treated and calcium oxide in the depolymerising device (1), and after having closed the upper base (10) of the latter, the burner (18) is disposed inside the depolymerising device by means of the respective carriage (180). Then the burner (18) is activated for a predetermined time (for example, a programmable time between 5 and 10 minutes) so as to start the combustion of tires. Then, the burner (18) is de-activated and disposed out of the depolymerising device (1) and the combustion continues in an autonomous way, thanks to the air passing through the valve (Y) provided under the interstice (100), through the interstice (100) and the openings (X) placed on the base horizontal grid (19). During these operations, the valve (Y) is always open. The thermal process which is carried out inside the depolymerising device (1), wherein the working temperature is about between 100° C. and 135° C. and the pressure is up to 10 mBar lower than the atmospheric pressure, consists of a depolymerisation of the rubber of the products introduced into depolymerising device, with formation of a bi-phases mixture comprising combustible micro-particles deriving from the depolymerisation. The fluid which, thanks to the depression ensured by the unit (4) disposed downstream, arrives at the phases separator (2) is subject, within the latter, to a physical separation of at least a part of the liquid phase from the gas phase. In detail, when the fluid enters the separator (2) through the opening (22), it is subject to cooling, a condensation phenomenon takes place, and the thus formed liquid directs towards the bottom (21) of the body (2) and, from there, through the pipe (290), it arrives at the container (29); meanwhile, the mostly gaseous phase is aspired through the pipe (28) and the pipe (6) to be compressed and sent to the burner (5). The liquid aspired by the pump (291) and pulverized by the injectors (292) in the chamber (25) involves the aforementioned condensation, since the particles of the liquid phase tend to aggregate around the particles exiting from the injectors. The liquid drawn from the container (29) is a combustible substance, storable in tanks, cans and any other suited container in which it can be decanted, and has the physicochemical characteristics shown in the table 1 which follows, as resulting from analyses carried out on a sample taken at the end of a cycle.

The gases exiting the burner (5) exhibit the characteristics indicated in the table 2 which follows, resulting from analyses especially carried out (Methods of test: according to DM 25 Aug. 2000-Unichim No. 494-UNI 10493-Handbooks Unichim No. 122, 158).

Tests carried out with an experimental plant made it possible to check a production of combustible liquid ranging between 35 and 40% of the weight of tires (about 350-400 kg of liquid each 1000 kg of tires introduced and treated into the depolymerising device 1). The combustible liquid thus product can be advantageously used also to feed an ordinary diesel engine, even mixed with diesel oil.

The calcium oxide (introduced into the depolymerising device 1 in a quantity ranging between 1% and 3% in weight of the products to be treated) with the steam which develops from depolymerisation and with the steam introduced as described below, determines the formation of calcium hydroxide which, while binding to chlorine and sulphur released by the waste material during depolymerisation, comprises inert salts which deposit with the metal residues on the bottom of the depolymerising device. Thus, introduction of acid substances into the environment is avoided. The residues are basically made up by the metallic materials which constitute the armours or metal structures of the products to be depolymerised, having a melting point higher than the working temperature of the depolymerising device (1). These residues, which contain carbon, steel or other metals, can be directly destined to foundries or, alternatively, can be selected for separating the various metal components from the non-metal ones, in which carbon is prevailing, and separately used.

When the temperature sensed by the sensor (81) exceeds 50° C., water is introduced into said interstice (100) through a corresponding valve, not visible into the annexed drawings. The quantity of water introduced into the interstice (100) raises when the temperature sensed by the sensor (81) increases.

Figure 4:
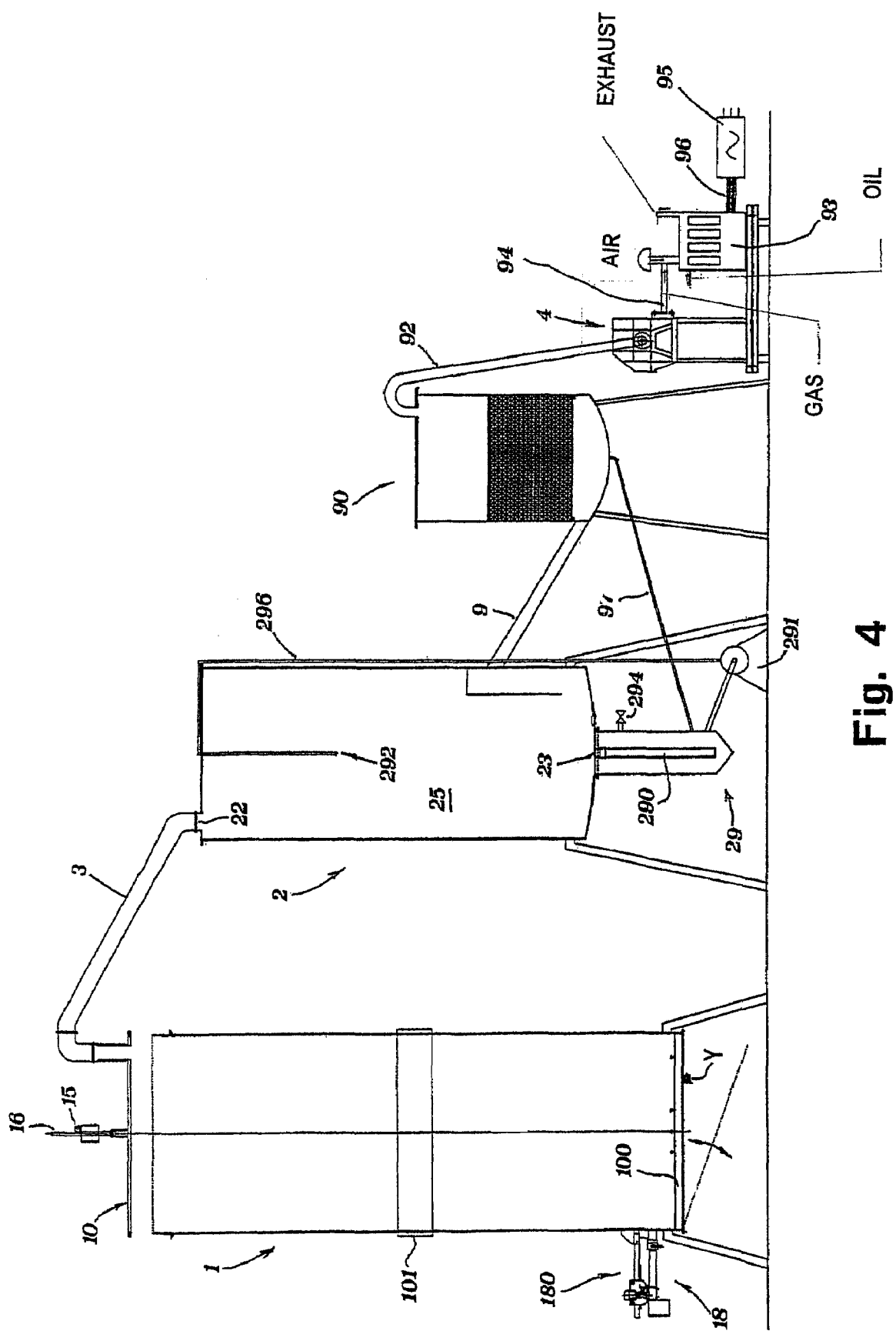
FIG. 4 represents a diagram similar to the diagram of FIG. 1, in which there is a different use of the produced substances.

When the temperatures sensed by the sensors (91) and (31) are higher than 135° C. and, respectively, than 200° C., there is a lower gas demand from the burner (5) or, in reference to the plant schematically represented in FIG. 4, from the engine (93). When the production of gas is lower than a predetermined value, the cycle is ended, by admitting that such circumstance corresponds to the exhaustion of the mass to be depolymerised. Another control of the process can be carried out by measuring the pressure in the interstice (100) of the depolymerising device (1). In detail, by means of a pressure sensor placed in said interstice, it is possible to check if the local pressure is higher than the atmospheric pressure, for aspirating less air in the depolymerising device (1) so as to slow down the combustion, thus slowing down the thermochemical process, until the pressure in said interstice (100) becomes once again less than the atmospheric pressure, while allowing again the air to enter through the valve (Y).

With reference to the diagram of FIG. 1, the depolymerising device (1) is a fixed body supported by a fixed structure (1) and the base portion (19, 11) is connected to said body by means of a hinge with a horizontal axis to allow the opening of the same as a trap door (see dashed line) for the unloading of the residues at the end of the cycle.

With reference to the diagram of FIG. 2, the depolymerising device (1) is a body supported by a fixed structure (103) to which it is connected by a hinge with a horizontal axis (104) to allow overturning driven by a correspondent motor reducer (105) and to carry out the unloading of the residues at the end of the cycle through the upper base (10), i.e. through the loading mouth which, in this case, is also for unloading.

In both cases, as illustrated in detail in FIG. 3, the opening (12) of the upper base (10) of the depolymerising device (1) is prolonged in a telescopic way in the inner of the corresponding end of the pipe (3) which connects the depolymerising device (1) with the phases separator (2). The tight seal can be realized by means of several O-ring (123) disposed between the said prolongation and the pipe (3).

The starting and the coordination of the components of the described installation are automatically controllable with programmable electronic means. Such programmable means are of known type by the technicians of industrial automation and, therefore, are not described more in detail.

With reference to the diagram of FIG. 4, a different treatment of the mostly gaseous phase at the outlet of the separator (2) is realized. More in detail, the mostly gaseous phase at the outlet of the separator (2) arrives, through a correspondent pipe (9), to a de-oiler filter (90). From the latter, the filtered gas arrives to the aforementioned aspiration unit (4) through a correspondent pipe (92) which connects the upper base of the filter (90) to the same aspiration unit (4). The latter, being connected to the aspiration of a diesel engine (93) by means of a correspondent duct (94), conveys said filtered gas in the same section of the engine (93) through which the combustive air is aspired. Said engine (93) is connected, by means of a drive-shaft (96), with an electric generator (95) which can be also connected to the electrical supply net. Said filter (90) is already known, being of the type commonly employed to de-oil gases. For example, can be used a filter of the type called "demister" comprising a package of the very thin metal wires on whom the oily particles settle and fall down in the form of drops. The oily liquid thus separated from the gas and which is collected on the bottom of the filter (90) can be conveyed to the container (29) by means of a correspondent duct (97). The engine (93) can be supplied with the liquid produced in the phase separator (2) and possibly decanted for a predetermined time with the aim of eliminating the possible coal traces. The engine (93) can be also supplied with a mixture consisted by said decanted liquid and diesel oil, in addition to, naturally, to the only diesel oil. Relating to the process of depolymerisation of the products introduced into the depolymerising device (1) and to the separation of the phases in the separator (2) there are no differences compared to the case describes previously with reference to FIGS. 1-3, being only a different treatment of the gas substances.

Analyses expressly carried out on gas at the outlet of the filter (90) made it possible to check the characteristics described in the table 3 which follows.

The filtered gas introduced with the air into the diesel engine contributes, relating to the working conditions of the latter, for 5-20% of the energy necessary to the operation of the engine, the remaining part of energy being provided by the decanted liquid produced by the same plant and mixed with diesel oil. Experimental tests were carried out by means of a Ford 80 HP aspired diesel engine coupled to a 30 KVA three-phase asynchronous electric motor connected to a balanced resistive load.

Table 4 shows the results of four tests. In each test it was measured the power provided by the engine supplied with the air and decanted oil mixed with 1/5 in volume of diesel oil. Successively, without varying the flow rate of the mix liquid/diesel oil, the filtered gas was sent to the aspiration of the air of the engine, by measuring the flow rate of gas, and thus the thermal power relating to the gas, and the new values of electric output. In each test thus carried out the positive contribution of gas to the output of the thermodynamic transformation is resulted equal to almost the 20%.

In table 4 the symbols used in the first column have the following meanings:

$P_{oil}$: power absorbed by the resistive load by supplying the engine with the oil produced by the plant and without adding gas to the air aspired by the engine ($P_{oil}=1.73*V_{oil}*I_{oil}$);

$P_{oil+gas}$: power absorbed by the resistive load by supplying the engine with the oil produced by the plant and by adding gas to the air aspired by the engine ($P_{oil+gas}=1.73*V_{oil+gas}*I_{oil+gas}$);

$\Delta P = P_{oil+gas} - P_{oil}$;

CR: contribution of the gas to the output of the thermodynamic transformation.

The lower heating power of gas obtained by depolymerisation of tires only we has been considered equal to 695 Kcal/Nm$^3$, equivalent to 808 Wh/Nm$^3$.

The process for the production of combustible substances in accordance with the present invention comprises, as previously described, a phase of depolymerisation of rubber products like worn tires and the like, with production of a two-phases fluid mixture, and involves separating and collecting at least a part of the liquid phase of said mixture. Both the depolymerisation and the separation of the phases are realizable under depressurized conditions. The mostly gaseous phase is usable to supply a burner, to be introduced, with the combustive air, in a diesel engine or in any other manner. In practice, the execution details may vary as regards the shape, the size, the arrangement of the elements, the kind of material used, but they are within the limits of the solution adopted and within the limits of the protection offered by the present patent.

TABLE 1

| Test method | Test type | M.U. | Results |
|---|---|---|---|
| ASTM D 1298/90 | Density at 15° C. | Kg/m3 | 958.5 |
| ASTM D 445/94 | Viscosity at 50° C. | mm2/s | 9.654 |
| NOM 47/71 | Viscosity at 50° C. conversion | ° E | 1.801 |
| ASTM D 445/94 | Viscosity at 100° C. | mm2/s | 2.339 |
| NOM 47/71 | Viscosity at 100° C. conversion | ° E | 1.154 |
| ASTM D 97/93 | Sliding point | ° C. | −21 |
| ASTM D 240/92 | Upper calorific power | MJ/kg | 42.814 |
|  |  | Kcal/kg | 10228 |
| ASTM D 240/92 | Lower calorific power | MJ/kg | 40.562 |
|  |  | Kcal/kg | 9688 |
| ASTM D 5291/92 | Elementary analysis C/H/N | % weight | 87.08/10.62/0.34 |
| ASTM D 3180/89 | Oxygen (calculated) | % weight | 0.77 |
| ASTM D 4530/93 | Carbon residue | % weight | 1.91 |
| IP 143/96 | Asphaltenes | % weight | 1 |
| ASTM D 482/95 | Ashes | % weight | 0.04 |
| ASTM D 95/90 | Water by distillation | % volume | 0.1 |
| ASTM D 93/94 | Flash point | ° C. | 72 |
| ASTM D 2622/98 | Sulphur | % weight | 1.17 |
| IP 288/95 | Vanadium/Nickel | mg/kg | <1/3 |
| IP 288/95 | Sodium | mg/kg | 2 |
| IP 377/95 | Aluminium | mg/kg | <1 |
| IP 375/95 | Total sediments (H.F.T.) | % weight | 0.02 |
| ASTM D 664/89 | Acidity | mgKOH/g | 0.126 |
| ASTM D 86/95 | Distillation |  |  |
|  | Distilled at 250° C. | % volume | 19 |
|  | Distilled at 350° C. | % volume | 74 |
| ASTM D 1500/91 | Colour |  | Black |
| Olfactory | Odour |  | Intense |

TABLE 2

| Parameter | Unity | Medium value | Standard deviation | Limit value |
|---|---|---|---|---|
| Section of the sampling conduit | m² | 0.119 |  |  |
| Effluent speed | m/sec | 5.6 | 0.3 |  |
| Effluent temperature | ° C. | 308.2 | 2.4 |  |
| Atmospheric pressure | mbar % | 992 |  |  |
| Steam in the effluent | v/v % | 2.31 |  |  |
| Effluent density | Kg/mc | 0.6 |  |  |
| Measured effluent flow rate | mc/h | 2408 | 123 |  |
| Normal effluent dry flow rate | NmcS/h | 1082 | 60 |  |
| Measured oxygen content | v/v % | 12.3 |  |  |
| Reference oxygen content | v/v % | 11 |  |  |
| Carbon oxide correct concentration | mg/mc | 3.4 | 1.1 | 100 |
| Total powders correct concentration | mg/NmcS | 11.3 | 0.3 | 30 |
| Total powders flow | gr/h | 10.5 | 0.25 |  |
| Correct concentration S.O.V. (as C.O.T.) | mg/NmcS | 0.3 | 0.05 | 20 |
| Mass flow S.O.V. (as C.O.T.) | gr/h | 0.27 | 0.05 |  |
| Sulphur oxide correct concentration (as SO₂) | mg/NmcS | 61 | 6.7 | 200 |
| Total sulphur oxide flow (as SO₂) | gr/h | 57 | 6.3 |  |
| Nitrogen oxide correct concentration | mg/NmcS | 224 | 6.3 | 400 |
| Total nitrogen oxide flow (as NO₂) | gr/h | 212 | 6 |  |
| Total correct concentration hydrochloric acid total (as HCl) | mg/NmcS | 11.2 | 2 | 40 |
| Total hydrochloric acid mass flow (as HCl) | gr/h | 10.6 | 1.8 |  |
| Concentration correcte fluor total (F−) | mg/NmcS | 3.24 | 0.4 | 4 |
| Flux de masse fluor totale (F−) | gr/h | 3.1 | 0.4 |  |

TABLE 3

| component | % | Kcal/Nm³ at 0° C. | Kcal/Nm³ at 15.5° C. |
|---|---|---|---|
| CO | 13.2 | 400.5 | 378.8 |
| $CO_2$ | 14.2 | 0 | 0 |
| $CH_4$ | 2.16 | 185.1 | 175.3 |
| $O_2$ | 0.63 | 0 | 0 |
| $H_2$ | 5.77 | 148.9 | 140.9 |
| $N_2$ | 64.0 | 0 | 0 |
| Others | 0.04 | 0 | 0 |
| Total | 100 | 734.5 | 695.0 |

TABLE 4

| | No. test | | | |
|---|---|---|---|---|
| | I | II | III | IV |
| $P_{oil}$ (Electric Watt) | 2768 | 3089 | 5716 | 8979 |
| $P_{oil+gas}$ (Electric Watt) | 4850 | 5631 | 9512 | 12715 |
| ΔP (Electric Watt) | 2082 | 2542 | 3796 | 3736 |
| Gas flow rate (Nm³/h) | 12.7 | 15.2 | 23.4 | 23.3 |
| Gas power (Thermic watt) | 10300 | 12300 | 18900 | 18800 |
| CR (%) | 20.2 | 20.7 | 20.1 | 19.9 |

The invention claimed is:

1. A system for the production of combustible substances by means of depolymerization of rubber products, the system comprising:
a first connecting pipe;
a second connecting pipe;
a depressurized depolymerizing device, wherein depolymerization of a predetermined quantity of products takes place in said depressurized depolymerizing device such that a product mixture is produced, said product mixture including a liquid phase and a gas phase;
an aspiration unit;
a phases separator disposed downstream of said depolymerizing device, said phases separator comprising a substantially cylindrical body, with an upper base and a lower base, said phases separator being connected to said depolymerizing device via said first connecting pipe, said phases separator separating at least a part of the liquid phase of the product mixture exiting the depolymerizing device, said phases separator having a first outlet for the separated liquid phase and a second outlet for said product mixture in mostly said gaseous phase, said depolymerizing device being depressurized by said aspiration unit, said aspiration unit being disposed downstream of said phases separator, said aspiration unit being connected to said phases separator via said second connecting pipe, said phases separator comprising a septum or wall and a first chamber defined by an interior surface portion of said phases separator and said septum or wall, said septum or wall and another interior surface portion of said phases separator defining a second chamber having a closed top portion and an open bottom portion, said phases separator comprising a third connecting pipe, said third connecting pipe being disposed vertically in said second chamber, one end of said third connecting pipe being associated with said second outlet, another end of said third connecting pipe being located at a predetermined distance from said open bottom portion, said third connecting pipe being connected to said aspiration unit via said second connecting pipe, said phases separator comprising a container located at a position below said first outlet, said phases separator comprising a fourth connecting pipe, said container receiving said liquid phase of said product mixture via said fourth connecting pipe, said container having a lower opening;
a pump connected to said lower opening of said container;
injectors or atomizers disposed at a predetermined distance from said upper base of said phases separator, said pump moving said liquid phase of said product mixture to said injectors or atomizers such that said liquid phase of said product mixture is reintroduced into said first chamber;
a first tube;
a second tube, said pump being connected to said lower opening via said first tube, said pump being connected to said injectors or atomizers via said second tube, said second tube having a second tube portion, said second tube portion extending through said upper base of said phases separator, wherein a portion of said second tube portion is located within said first chamber, said container having an upper side opening for removing liquid not recycled by said pump.

2. A system according to claim 1, wherein said depolymerizing device is de-pressurized by means of an aspiration unit disposed downstream from said phase separator and connected with the latter by means of a correspondent pipe.

3. A system according to claim 1, wherein the upper base of said depolymerizing device is mounted on vertical guides and is brought under control of an electric motor by means of a transmission with pinion and toothed rack to allow the rising and the lowering of said upper base such that the products are introduce into the depolymerizing device and said upper base is closed after the products have been introduced into said depolymerizing device.

4. A system according to claim 1, wherein said depolymerizing device has an opening which constitutes a passage for a burner with carriage, said opening being located in an area of said lower base of said depolymerizing device.

5. A system according to claim 1, further comprising thermal sensors.

6. A system according to claim 1, further comprising:
a thermal sensor, wherein said lower base of said depolymerizing device has an interstice trough and a horizontal grid located at a spaced location from said base, wherein combustive air passes through said interstice trough, said thermal sensor being placed in said interstice, said thermal sensor sensing air temperature in a lower position with respect to said grid, wherein water is introduced in said interstice when a temperature sensed by said thermal sensor exceeds 50° C.

7. A system according to claim 1, further comprising:
a pressure sensor, said lower base of said depolymerizing device having an interstice trough, wherein combustive air passes through said interstice trough, said pressure sensor being located in said interstice trough, said pressure sensor sensing an air pressure within said interstice trough, wherein less air is aspirated in said depolymerizing device when a local pressure in said interstice trough is higher than an atmospheric pressure such that combustion decreases until pressure in said interstice trough is less than the atmospheric pressure.

8. A system according to claim 1, further comprising:
a motor reducer, said depolymerizing device being a body supported by a fixed structure, said depolymerizing device being connected to said fixed structure via a hinge connection, said depolymerizing device being overturned via said motor reducer such that residue from said depolymerizing cycle is unloaded from said upper base of said depolymerizing device.

9. A process for the production of combustible substances by depolymerization of rubber products, including a phase of depolymerization with the production of a fluid mixture with two phases, the process comprising the steps of:
providing an aspiration unit;
providing a first connecting pipe;
providing a phases separator, said phases separator comprising a lower base, said aspiration unit being connected to said phases separator via said first connecting pipe, said phases separator having a first outlet and a second outlet, said phases separator comprising a septum or wall and a first chamber defined by an interior surface portion of said phases separator and said septum or wall, said septum or wall and another interior surface portion of said phases separator defining a second chamber having a closed top portion and an open bottom portion, said phases separator comprising a second connecting pipe, said second connecting pipe being disposed vertically in said second chamber, one end of said second connecting pipe being associated with said second outlet, another end of said second connecting pipe being located at a predetermined distance from said open bottom portion, said second connecting pipe being connected to said aspiration unit via said first connecting pipe, said phases separator comprising a container located at a position below said first outlet, said phases separator comprising a third connecting pipe, said container receiving a liquid phase of said fluid mixture via said third connecting pipe, said container having a lower opening;

providing a pump connected to said lower opening of said container;

providing injectors or atomizers disposed at a predetermined distance from said upper base of said phases separator;

moving said liquid phase of said product mixture with said pump to said injectors or atomizers such that said liquid phase of said fluid mixture is reintroduced into said first chamber;

providing a first tube;

providing a second tube, said pump being connected to said lower opening via said first tube, said pump being connected to said injectors or atomizers via said second tube, said second tube having a second tube portion, said second tube portion extending through said upper base of said phases separator, wherein a portion of said second tube portion is located within said first chamber, said container having an upper side opening for removing liciuid not recycled by said pump;

separating a liquid phase from a mostly gas phase of said fluid mixture;

collecting at least a part of the liquid phase with said phases separator, wherein depolymerization and said separation of phases are carried out in a medium under vacuum.

10. A process for the production of combustible substances by depolymerization of rubber products, including a phase of depolymerization with the production of a fluid mixture with two phases, the process comprising the steps of:

providing an aspiration unit;

providing a first connecting pipe;

providing a phases separator, said phases separator comprising a lower base, said aspiration unit being connected to said phases separator via said first connecting pipe, said phases separator having a first outlet and a second outlet, said phases separator comprising an interior phases separator surface and a wall, wherein a portion of said interior phases separator surface and said wall define a first chamber, another portion of said interior phases separator surface and said wall defining a second chamber having a closed top portion and an open bottom portion, said phases separator comprising a second connecting pipe, said second connecting pipe being disposed vertically in said second chamber, one end of said second connecting pipe being associated with said second outlet, another end of said second connecting pipe being located at a spaced location from second outlet, said second connecting pipe being connected to said aspiration unit via said first connecting pipe, said phases separator comprising a container located at a position below said first outlet and a third connecting pipe, said container receiving a liquid phase of said fluid mixture via said third connecting pipe, said container having a lower opening;

providing a pump connected to said lower opening of said container;

providing injectors or atomizers disposed at a predetermined distance from said upper base of said phases separator;

preparing a fluid mixture via a depolymerization process of rubber products, said fluid mixture comprising a liquid phase and a gas phase;

supplying said phases separator with said fluid mixture;

separating said liquid phase from said gas phase of said fluid mixture with said phases separator;

collecting at least a part of said liquid phase with said container, wherein depolymerization of said fluid mixture and said separation of phases are carried out in a medium under vacuum;

moving said liquid phase of said product mixture to said injectors or atomizers with said pump such that said liquid phase of said fluid mixture is reintroduced into said first chamber;

providing a first tube;

providing a second tube, said pump being connected to said lower opening via said first tube, said pump being connected to said injectors or atomizers via said second tube, said second tube having a second tube portion, said second tube portion extending through said upper base of said phases separator, wherein a portion of said second tube portion is located within said first chamber, said container having an upper side opening;

removing liquid not recycled by said pump via said upper side opening of said container.

* * * * *